(12) United States Patent
Vernon et al.

(10) Patent No.: US 10,580,367 B2
(45) Date of Patent: Mar. 3, 2020

(54) DISPLAY MAPPING FOR HIGH DYNAMIC RANGE IMAGES

(71) Applicant: Dolby Laboratories Licensing Corporation, San Francisco, CA (US)

(72) Inventors: Stephen D. Vernon, Hillsborough, CA (US); Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/476,967

(22) PCT Filed: Jan. 8, 2018

(86) PCT No.: PCT/US2018/012780
§ 371 (c)(1),
(2) Date: Jul. 10, 2019

(87) PCT Pub. No.: WO2018/132329
PCT Pub. Date: Jul. 19, 2018

(65) Prior Publication Data
US 2019/0355314 A1    Nov. 21, 2019

Related U.S. Application Data

(60) Provisional application No. 62/449,832, filed on Jan. 24, 2017, provisional application No. 62/447,541, (Continued)

(51) Int. Cl.
*G09G 3/34* (2006.01)
*G09G 3/20* (2006.01)
(Continued)

(52) U.S. Cl.
CPC ......... *G09G 3/3413* (2013.01); *G09G 3/2003* (2013.01); *H04N 1/6027* (2013.01); *H04N 1/6088* (2013.01); *H04N 19/98* (2014.11)

(58) Field of Classification Search
CPC .. G09G 3/3413; G09G 3/2003; H04N 1/6027; H04N 19/98; H04N 1/6088
See application file for complete search history.

(56) References Cited

U.S. PATENT DOCUMENTS 7,071,947 B1 * 7/2006 Papakipos ............... G06T 15/50
345/426
9,224,363 B2    12/2015 Ballestad
(Continued)

FOREIGN PATENT DOCUMENTS

CN    105009580    10/2015
EP    0377386    7/1990
(Continued)

OTHER PUBLICATIONS

Mantiuk, R. et al "Modeling a Generic Tone-Mapping Operator" EUROGRAPHICS, vol. 27, 2008, No. 2, pp. 1-10.
(Continued)

*Primary Examiner* — Jonathan A Boyd

(57) ABSTRACT

Methods for mapping an image from one dynamic range to another dynamic range are presented. The mapping is based on a sigmoid-like function determined by three anchor points. The first anchor point is determined using the black point levels of a reference and a target display, the second anchor point is determined using the white point levels of the reference and target displays, and the third anchor point is determined using mid-tones information data for the input image and the mid-tones level of the target display. The mid-tones level of the target display is computed adaptively based on a desired range of constant brightness and a mapping function. The mapping function mapping may be piece-wise linear (in the log domain), piece-wise continuous, or a sigmoid. Examples for mapping high dynamic range images to standard dynamic range displays are presented.

15 Claims, 3 Drawing Sheets

Related U.S. Application Data filed on Jan. 18, 2017, provisional application No. 62/444,747, filed on Jan. 10, 2017.

(51) Int. Cl.
*H04N 1/60* (2006.01)
*H04N 19/98* (2014.01)

(56) References Cited

U.S. PATENT DOCUMENTS

| | | | |
|---|---|---|---|
| 2007/0223813 A1* | 9/2007 | Segall | H04N 1/6027 |
| | | | 382/166 |
| 2013/0076974 A1* | 3/2013 | Atkins | H04N 5/235 |
| | | | 348/362 |
| 2013/0155330 A1 | 6/2013 | Longhurst | |
| 2016/0360212 A1* | 12/2016 | Dai | H04N 19/186 |

FOREIGN PATENT DOCUMENTS

| | | |
|---|---|---|
| EP | 3051487 | 8/2016 |
| WO | 2012/166382 | 12/2012 |

OTHER PUBLICATIONS

Mantiuk, R. et al "Display Adaptive Tone Mapping" ACM SIGGRAPH 2008 papers, New York, New York, USA Aug. 1, 2008, pp. 1-10.

SMPTE ST 2094-10:2016: "Dynamic Metadata for Color Volume Transform—Application #1" pp. 1-15, Jun. 13, 2016.

* cited by examiner

… (1)

DISPLAY MAPPING FOR HIGH DYNAMIC RANGE IMAGES

CROSS-REFERENCE TO RELATED APPLICATIONS

This application claims the benefit of priority to U.S. Provisional Patent Application Ser. No. 62/449,832, filed Jan. 24, 2017, U.S. Provisional Patent Application Ser. No. 62/447,541, filed Jan. 18, 2017, and U.S. Provisional Patent Application Ser. No. 62/444,747, filed Jan. 10, 2017, all of which are incorporated herein by reference in their entirety.

TECHNOLOGY

The present invention relates generally to images. More particularly, an embodiment of the present invention relates to display mapping of high-dynamic range (HDR) images and video signals from a first dynamic range to a second dynamic range.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

High Dynamic Range (HDR) content authoring is now becoming widespread as this technology offers more realistic and lifelike images than earlier formats. However, many display systems, including hundreds of millions of consumer television displays, are not capable of reproducing HDR images. One approach being used to serve the overall market is to create two versions of new video content—one using HDR images, and another using SDR (standard dynamic range) images. However, this requires content authors to create their video content in multiple formats, and may require consumers to know which format to buy for their specific display. A potentially better approach might be to create one version of content (in HDR), and use an image data transformation system (e.g., as part of a set-top box functionality) to automatically down-convert the HDR content to SDR for compatibility with legacy displays. To improve existing display schemes, as appreciated by the inventors here, improved techniques for mapping HDR images into SDR images are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods for mapping high dynamic range (HDR) images to SDR images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for mapping images from one dynamic range (e.g., HDR) into images of a second dynamic range (e.g., SDR). In a video decoder, in one embodiment, a processor receives first information data comprising a black point level (x1), a mid-tones level (x2), and a white point level (x3) in the first dynamic range, and second information data comprising a black point level (y1) and a white point level (y3) in the second dynamic range. The processor determines a first and a second bounding value for a mid-tones level in the second dynamic range based on the second information data and a desired range of constant brightness. Then, it determines the mid-tones level in the second dynamic range based on the first and second information data, the first and second bounding values, and a mapping function. The processor determines a transfer function to map pixel values of the input image in the first dynamic range to corresponding pixel values of an output image in the second dynamic range, wherein the transfer function comprises three anchor points, wherein the first anchor point is determined using the black point levels in the first and second dynamic ranges, the second anchor point is determined using the white point levels in the first and second dynamic ranges, and the third anchor point is determined using the mid-tones levels of the first and second dynamic ranges. Finally, the processor maps the input image to the output image using the determined transfer function.

In one embodiment the mapping function is based on a piece-wise linear (in the log domain) function. In another embodiment, the mapping function is based on a piece-wise, continuous, non-linear function mapping. In another embodiment, the mapping function is based on a sigmoid function.

Examples of mapping HDR images into an SDR display using a spline and a sigmoid function to compute the mid-tones level in the second dynamic range are provided.

Dynamic Range Conversion

Video Coding of HDR Signals

Figure 1:
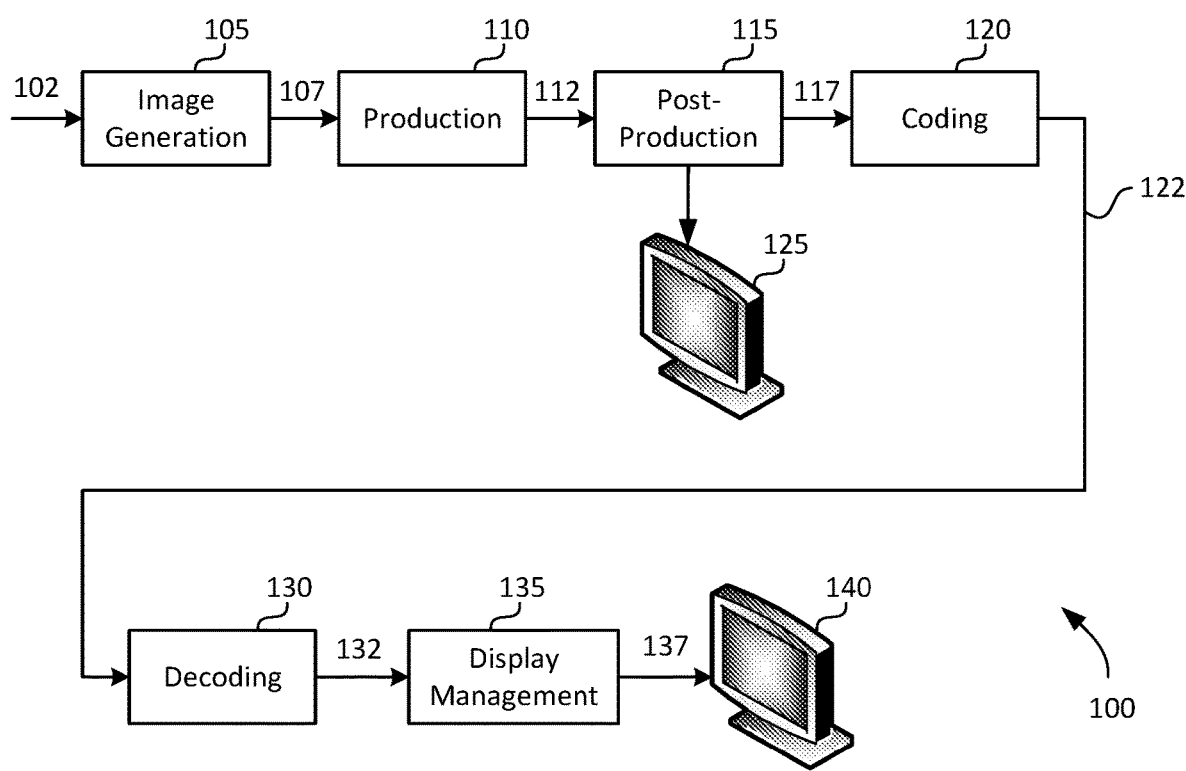
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Image Transformation Using a Sigmoid Mapping

In U.S. Pat. No. 8,593,480, "Method and apparatus for image data transformation," by A. Ballestad and A. Kostin, to be referred herein as the '480 Patent, which is incorporated herein by reference in its entirety, the inventors proposed an image transformation mapping using a parametrized sigmoid function that can be uniquely determined using three anchor points and a mid-tones free parameter. An example of such function is depicted in FIG. 2.

Figure 2:
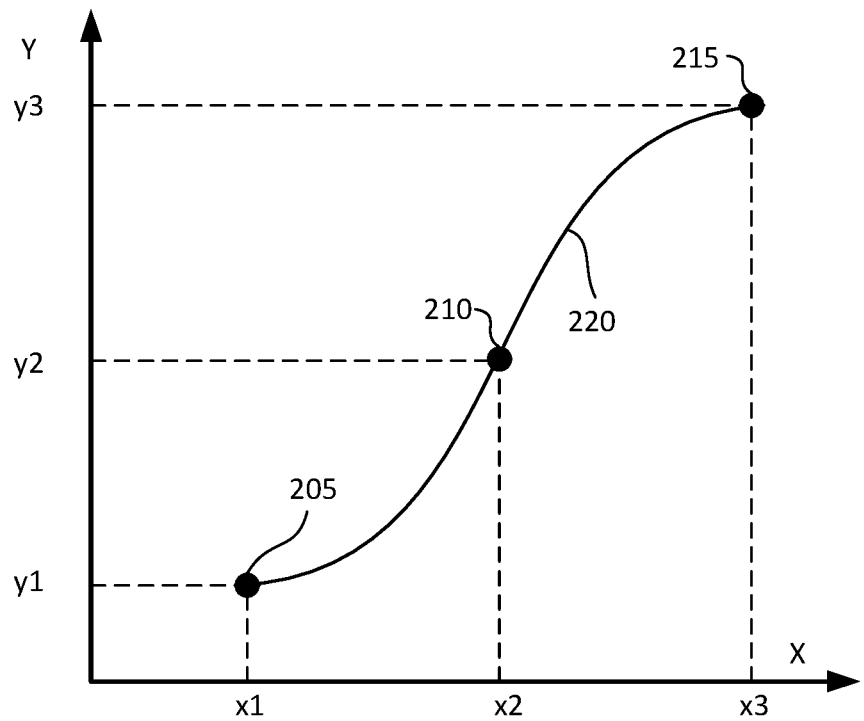
FIG. 2 depicts an example mapping function for mapping images from a first dynamic range to a second dynamic range using three anchor points.

As depicted in FIG. 2, the mapping function (220) is defined by three anchor points (205, 210, 215): a black point (x1, y1), a mid-tones point (x2, y2), and a white point (x3,y3). This transformation has the following properties:

The values from x1 to x3 represent the range of possible values that describe the pixels that make up the input image. These values may be the brightness levels for a particular color primary (R, G, or B), or may be the overall luminance levels of the pixel (say the Y component in a YCbCr representation). Typically, these values correspond to the darkest (black point) and brightest (white point) levels supported by the display used to create the content (the limits of the "mastering display" (125)); however, in some embodiments, when the characteristics of the reference display are unknown, these values may represent minimum and maximum values in the input image (e.g., in R, G, or B, luminance, and the like), which can be either received via image metadata or computed in the receiver.

The values from y1 to y3 represent the range of possible values that describe the pixels that make up the output image (again either color primary brightness or overall luminance levels). Typically, these values correspond to the darkest (black point) and brightest (white point) levels supported by the intended output display (the limits of the "target display" (140)).

Any input pixel with the value x1 is constrained to map to an output pixel with the value y1, and any input pixel with the value x3 is constrained to map to an output pixel with the value y3.

The values of x2 and y2 represent a specific mapping from input to output that is used as an anchor point for some "midrange" (average or mid-tones level) element of the image. For example, this midrange may represent an arithmetic mean or average, a geometric mean, or some other value of interest (say, skin tones). Considerable latitude is permitted in the specific choice of x2 and y2, and the '480 Patent teaches a number of alternatives for how these parameters may be chosen.

Once the three anchor points have been chosen, the transfer function (220) may be described as $$y = \frac{C_1 + C_2 x^n}{1 + C_3 x^n},\qquad(1)$$

where $C_1$, $C_1$, and $C_3$ are constants, x denotes the input value for a color channel or luminance, y denotes the corresponding output value, and n is a free parameter that can be used to adjust mid-tone contrast, and which, without loss of generality, herein will be considered to be set to one (n=1).

As described in the '480 Patent, the $C_1$, $C_1$, and $C_3$ values may be determined by solving $$\begin{pmatrix} c_1 \\ c_2 \\ c_3 \end{pmatrix} = \frac{1}{x_3 y_3 (x_1 - x_2) + x_2 y_2 (x_3 - x_1) + x_1 y_1 (x_2 - x_3)} * \begin{pmatrix} x_2 x_3 (y_2 - y_3) & x_1 x_3 (y_3 - y_1) & x_1 x_2 (y_1 - y_2) \\ (x_3 y_3 - x_2 y_2) & (x_1 y_1 - x_3 y_3) & (x_2 y_2 - x_1 y_1) \\ (x_3 - x_2) & (x_1 - x_3) & (x_2 - x_1) \end{pmatrix} \begin{pmatrix} y_1 \\ y_2 \\ y_3 \end{pmatrix}.\qquad(2)$$

In an embodiment, while x1 and x3 may be set based on the characteristics of the reference display, x2 may be set based on the value that represents the geometric mean of the image data luminance. As this calculation can be complex for a large image, in an embodiment, such signal-dependent values may be pre-computed by the encoder and passed to downstream decoders as metadata (e.g., as a mid value).

Automatic down-conversion is not a simple task. HDR images are capable of displaying a tremendous amount of detail, in a wide range of image types, including:
  Mostly dark images, with important details in the shadows (e.g., a night-time outdoor scene)
  Mostly bright images, with important details in the highlights (e.g., image of clouds in a bright sky)
  "Normal" images with some very bright highlights and some very dark spots (e.g., image of a car with sun glinting off the chrome in a few spots, and a few very dark shadow areas)

For each of these three example images, the behavior of the automatic down-converter needs to be slightly different:
  For the image of a night-time outdoor scene, the darker end of the luminance range should be maintained as much as possible. If necessary, it should be shifted up to meet the minimum brightness of the output display. In this case, it is fine to heavily compress the bright end of the luminance range, as few, if any bright pixels exist in the image.
  For the image of clouds in a bright sky, the brighter end of the luminance range should be maintained as much as possible. If necessary, it should be shifted down to meet the maximum brightness of the output display. In this case, it is fine to heavily compress the dark end of the luminance range, as few, if any dark pixels exist in the image.
  For the image of a car with some very bright highlights and some very dark spots, the middle part of the luminance range should be maintained as much as possible. If possible, the brightness of the main part of the image should in fact be left alone. As for the very bright and very dark spots, it is fine to heavily compress these—i.e., darken the chrome glint, and lighten the shadows.

In the context of the image data transformation mapping described by FIG. 2, the relevant issue is how to best choose the middle anchor point values x2 and y2:
  For the dark scene, x2 and y2 should be chosen to ensure good contrast reproduction at the low end of the brightness scale
  For the bright scene, x2 and y2 should be chosen to ensure good contrast reproduction at the high end of the brightness scale
  For the normal scene, x2 and y2 should be chosen to ensure good contrast reproduction in the middle of the brightness scale To achieve these ends, a good way to start is to set the value of x2 to be equal to the midrange or average brightness of the overall image. This ensures that those pixels that are near the average overall brightness will retain good relative contrast, at the expense of some pixels that are far away from the average (much brighter or much darker) being heavily compressed. A more difficult problem is how to choose the value of y2.

Mid-Tones Control in Image Transformations

In Annex B of the SMPTE standard 2094-10, "Dynamic Metadata for Color Volume Transform—Application #1, SMPTE, 2016, which is incorporated herein by reference, it is proposed that y2 be calculated using the following equation:

$$y_2 = \sqrt{x_2 \sqrt{y_1 * y_3}},\qquad(3)$$

however, this mapping may produce results that are far from ideal. For one thing, this mapping almost always changes the average brightness of the output image relative to the input image. The only way the average brightness is retained is if y2 is the same as x2, which would only happen for those images for which the average brightness x2 happens to be the same as $\sqrt{y_1 * y_3}$.

Another defect of this mapping becomes apparent in the case of an image that gets brighter (or darker) as a function of time. As the input image brightness increases, the output image brightness also increases, but at a rate only half that of the input. This is because brightness is perceived on a log scale, and $\ln(\sqrt{x_2}) = 0.5 * \ln(x_2)$. So, even if the output image did happen to have the same average brightness as the input image, any change in the brightness of the input image as a function of time would cause the output image to lose this equivalence.

The mapping of equation (3) also suffers from a few other problems, including the following:
  It is possible that sufficiently high values of x2 could cause the computed y2 to be larger than y3. This issue is anticipated in SMPTE 2094-10 Annex B, where it is suggested that an upper limit might be imposed equal to 0.8*y3. This is an extreme non-linearity that, although could only happen under rather unusual circumstances, would nonetheless result in unsatisfying results should it ever occur.
  The mapping of equation (3) is unusable for cases where the target display and the mastering display both have the same brightness capabilities (i.e., x1=y1 and x3=y3). In this case, it would be expected that the output image should be the same as the input image, but this will in general not be possible with the mapping defined by equation (3)—it would only occur if x2 happens to be equal to $\sqrt{y_1 * y_3}$.

This invention describes an improved method of calculating y2 that avoids most of the issues discussed above. First of all, it is recognized that the ideal way to calculate y2 is to simply set it equal to x2. This will ensure that the average brightness of the output image is as close as possible to the average brightness of the input image, and furthermore that as the input average brightness changes, the output average brightness will change in an equal measure; however, this simple mapping is generally not possible.

Generally, the capabilities of the target display are constrained relative to the mastering display, such that either y1>x1, or y3<x3, or both. As a result, the simple mapping of y2=x2 will not be possible either at the low end of the range, or the high end, or both.

In an embodiment, a good compromise is to use the mapping y2=x2 over as much of the brightness range as possible (in particular the middle of the range), and to use a less optimal mapping for those values at the ends of the range. In this invention, two alternative options are proposed to achieve this: a) a piecewise linear mapping, and b) a continuous function mapping.

Piecewise Linear Mapping

In this option, the range of Y values is divided into three sections: high, middle, and low. The boundaries of these sections may be set in a number of ways, but for the present one may assume that they are statically set, for example, without limitation, the low section may cover approximately the bottom 20% of the range of Y values, the high section covers approximately the top 20%, and the middle section covers the remaining 60%. These boundary values can be computed as follows:

$$b_1 = \exp[\ln(y_1) + 0.2(\ln(y_3) - \ln(y_1))], \quad (4a)$$

$$b_2 = \exp[\ln(y_1) + 0.8(\ln(y_3) - \ln(y_1))].$$

Alternatively, equations (4a) may be simplified using logarithmic properties as $$b_1 = y_1 * \left(\frac{y_3}{y_1}\right)^{t_1}, \quad (4b)$$

$$b_2 = y_1 * \left(\frac{y_3}{y_1}\right)^{t_2},$$

where t1 and t2 are the desired percentage thresholds in (0,1) in terms of the maximum luminance Y (e.g., t1=0.2 and t2=0.8, or t1=0.1 and t2=0.3, and the like).

Then, a mapping from x2 to y2 is constructed using a piecewise linear curve (albeit, linear in the log domain), which can be implemented using the following set of three options:

if $(x_2<b_1)$, then $$y_2 = \exp\left[\ln(y_1) + \ln\left(\frac{b_1}{y_1}\right) * \frac{\ln\left(\frac{x_2}{x_1}\right)}{\ln\left(\frac{b_1}{x_1}\right)}\right], \quad (5a)$$

if $(b_1 \leq x_2 \leq b_2)$, then $$y_2 = x_2, \quad (5b)$$

if $(b_2 < x_2)$, then $$y_2 = \exp\left[\ln(b_2) + \ln\left(\frac{y_3}{b_2}\right) * \frac{\ln\left(\frac{x_2}{b_2}\right)}{\ln\left(\frac{x_3}{b_2}\right)}\right], \quad (5c)$$

Alternatively, using logarithmic properties, (5a) and (5c) may be rewritten as if $(x_2<b_1)$, then $$y_2 = y_1 * \left(\frac{x_2}{x_1}\right)^{e_1}, \quad (5d)$$

if $(b_1 \leq x_2 \leq b_2)$, then $$y_2 = x_2,$$

if $(b_2 < x_2)$, then $$y_2 = b_2 * \left(\frac{x_2}{b_2}\right)^{e_2}, \quad (5e)$$

where $$e_1 = \frac{\ln\left(\frac{b_1}{y_1}\right)}{\ln\left(\frac{b_1}{x_1}\right)} \quad (5f)$$

$$e_2 = \frac{\ln\left(\frac{y_3}{b_2}\right)}{\ln\left(\frac{x_3}{b_2}\right)}$$

This mapping achieves several useful results:

Over most of the range of the target display (namely the middle 60%), the output image brightness will track the input image brightness If the target display happens to match the mastering display at either one end of the range or the other (or both), this mapping will reduce to a simple straight line at the end or the other (or both). In other words, if x1=y1 or x3=y3, this mapping will do the right thing. If both x1=y1 and x3=y3, this mapping will compute an output image that is exactly the same as the input image in all cases.

This mapping will ensure that mostly bright or mostly dark images are processed in a reasonable fashion. In particular, since the slope of the lowest and highest segments are guaranteed to be positive, at least some of the contrast in the input image will be preserved in the output image.

Drilling down a bit deeper on the last point, it may be useful to choose values for b1 and/or b2 that result in a steeper slope that the 20%/80% static approach, depending on the actual values of x1, y1, x3, and y3. In this way, one could trade off the retained contrast at the extremes against the range over which constant brightness is maintained. So, another aspect of this invention in the case of the piecewise linear function is the idea that the choice of boundary points may depend on the desired tradeoff.

Continuous Function Mapping

This option is very similar with the piecewise linear mapping, with one significant difference. Namely, rather than using simple linear segments in all three sections, a curved function is used in the upper and lower sections (a linear segment of y2=x2 is still used in the middle section). If we refer to the lower section function as $f(x)$, and the upper section function as g(x), then the overall mapping can be defined as follows:

if $(x_2 < b_1)$, then $$y_2 = f(x_2), \quad (6a)$$

if $(b_1 \leq x_2 \leq b_2)$, then $$y_2 = x_2, \quad (6b)$$

if $(b_2 < x_2)$, then $$y_2 = g(x_2). \quad (6c)$$

Many types of curved functions may be used in this option. One option is a 3rd order spline function. But other types are also possible. Whatever function type is used, it should conform to the following characteristics:

$f(b_1) = b_1$ and $g(b_2) = b_2$, to ensure that the mapping is continuously connected $f'(b_1) = 1$ and $g'(b_2) = 1$, to ensure that the first derivative of these functions line up with the linear segment for a smooth overall result $f(x_1) = y_1$ and $g(x_3) = y_3$, to meet the mapping requirements at the edges $f'(x_1) > 0$ and $g'(x_3) > 0$ to ensure that some amount of contrast is retained at the edges of the brightness range.

If a 3-rd order spline function is used, it may be useful to set the first derivatives (slopes) at the edges to a value like 0.3. A higher value may result in too much waviness in the function, which could create problems for image sequences with varying brightness levels. It may also be useful to set the boundaries a bit closer together, such as 30% and 70% of the range, as the matching slope of the curved functions will tend to extend the effective linear range past these boundaries.

This mapping option achieves (or nearly achieves) the same useful results as the piecewise linear mapping:

Over most of the range of the target display, the output image brightness will track the input image brightness.

If the target display happens to match the mastering display at either one end of the range or the other (or both), this mapping will reduce to a curve that is very close to a simple straight line, and could in fact be a straight line if the slope at the edges is set to 1.0.

This mapping will ensure that mostly bright or mostly dark images are processed in a reasonable fashion (so long as the slope at the edges is set to a value greater than zero, and so long as the resulting curve is not too wavy)

In addition, this mapping option achieves the added benefit of not having any "sharp edges" across its range. The edges created at the boundary points b1 and b2 in the piecewise linear mapping could cause a noticeable artifact in the case of a sequence of images that are getting brighter or darker at a uniform rate (fade-in or fade-out), as the rate of change in the output images might suddenly be slower in the upper and lower sections than it is in the middle section.

Figure 3:
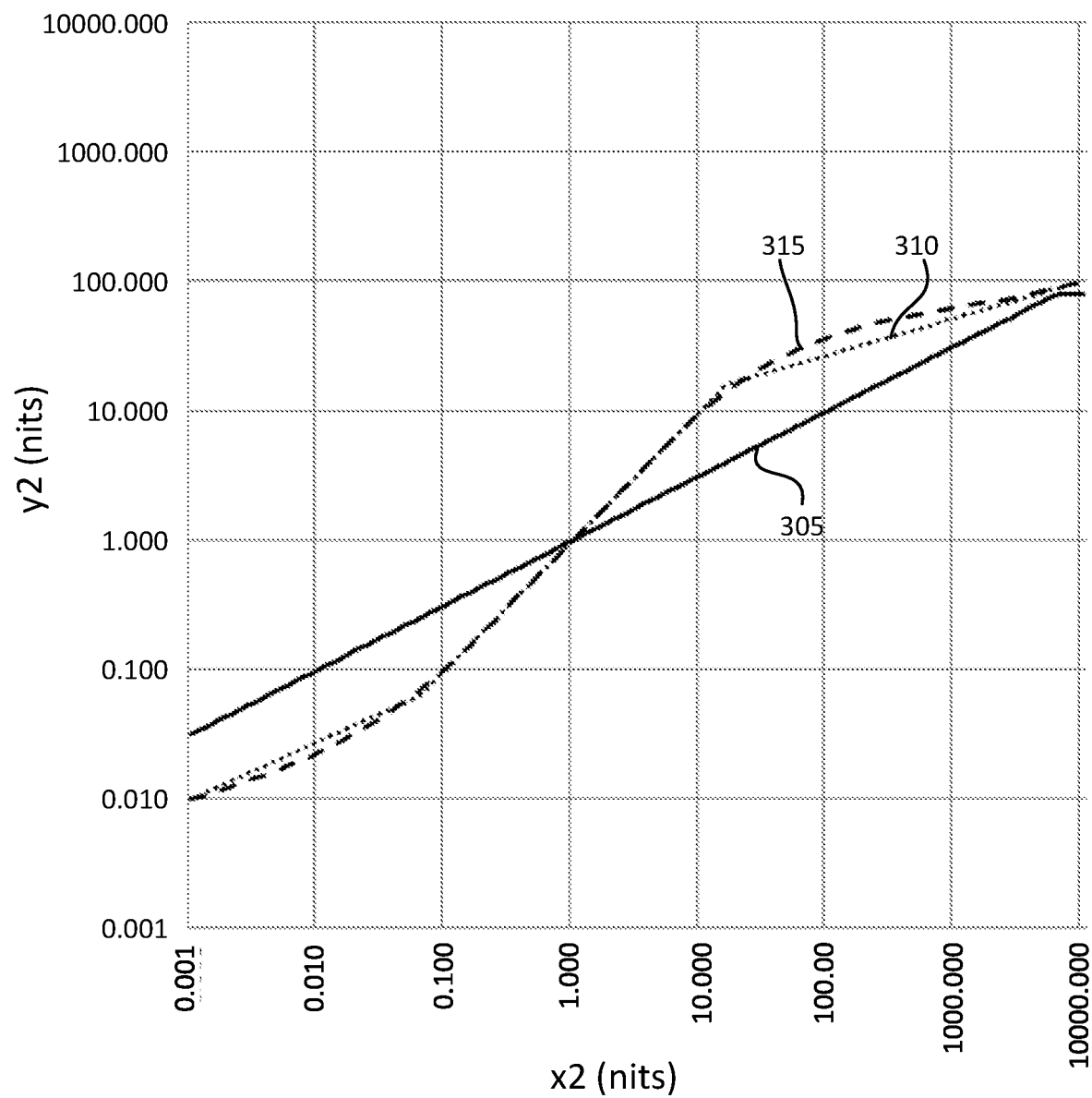
FIG. 3 depicts examples of determining a mid-tones anchor point for the mapping function in FIG. 2 according to embodiments of the present invention.

FIG. 3 compares the mapping of y2 as a function of x2 as described by SMPTE 2094-10 Annex B (305) with the two mappings taught by this invention: piecewise linear mapping (310) and continuous function mapping (315). In FIG. 3, the assumption is that the mastering display has range from 0.001 nits to 10,000 nits, and the target display has range from 0.01 nits to 100 nits. In this case, the piecewise linear mapping used boundaries at 20% and 80% of the output range, and the continuous function mapping used a 3-rd order spline function with boundaries at 30% and 70% of the output range, and a slope at the edges of 0.3.

Figure 4:
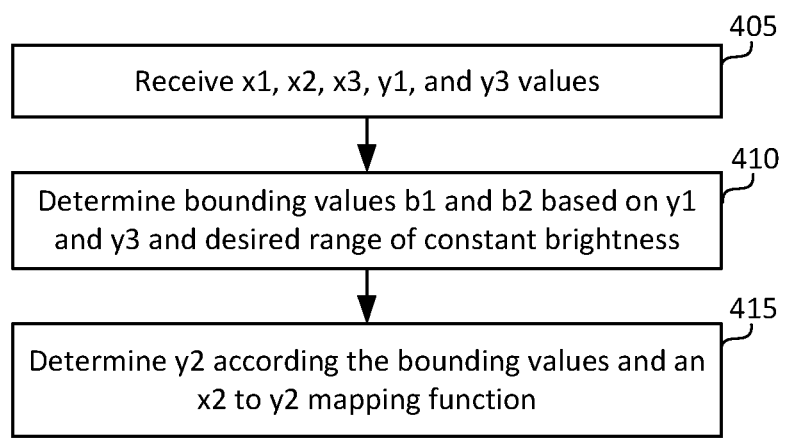
FIG. 4 depicts an example process for determining a mid-tones anchor point for image transformations according to an embodiment of the present invention.

FIG. 4 depicts an example of an example process to determine the coordinates of the mid-tones anchor point in FIG. 2 according to an embodiment. As described earlier, in step (405), a receiver has access (e.g., via metadata or other means) to the minimum and maximum brightness of a reference display or the input data (e.g., values x1 and x3), to the minimum and maximum brightness of the target display (e.g., values y1 and y3), and mid-tones values for the input data or the reference display (e.g., x2).

Given a desired range of contrast brightness (e.g., above 20% of minimum brightness and below 20% of maximum brightness), and the y1 and y3 values, in step (410), the receiver may compute boundary points b1 and b2 (e.g., see equation (4)). Then, in step (415), the receiver checks the value of x2 against the tree ranges (y1, b1), [b1, b2], and (b2, y3), and computes the corresponding value of y2 according to either a piece-wise linear mapping in the log domain (see equations (5)) or a continuous function mapping (see equations (6)).

In some embodiments, it may not be possible to know the characteristics of the reference or mastering display (125). Then one may need to determine the x1 and x3 values based on the minimum and maximum luminance of the input image signal. For example, consider the following variables:

S1: Minimum luminance of input image

S2: Average luminance of input image

S3: Peak luminance in input image

T1: Minimum luminance (black point) of target display

T3: Peak luminance (white point) of target display

M1: Minimum luminance of mastering display

M3: Peak luminance of mastering display where luminance values are computed in nits on a linearized signal (e.g., not gamma or PQ-coded). Then, as an example, the x1, x2, x3, y1, and y3 values may be computed as follows:

if M3 is known, then x3=max(M3, S3)

else x3=S3 if M1 is known, then x1=min(M1, S1)

else x1=S1

The values of y1 and y3 are computed based on the target display, but for HDR to SDR conversion they may be adjusted to ensure that they always represent a range no larger than the input range (x1, x3). For example, y1=max(T1, x1)

y3=min(T3, x3)

The value of x2=S2 and the value of y2 is computed according to the process depicted in FIG. 4.

In an another embodiment, instead of a spline function, one may determine the x2 and y2 coordinates using the same sigmoid as defined in equation (1). Consider the function $$f(x) = \frac{C_1 + C_2 x}{1 + C_3 x},$$

where $C_1$, $C_1$, and $C_3$ are again derived based on three anchor points (minx, miny), (midx, midy), and (maxx, maxy), derived using equation (2) by replacing x1, x2, x3 with minx, midx, and maxx, and by replacing y1, y2, y3 with miny, midy, and maxy.

Consider a receiver accessing (e.g., via metadata) (x1, x3) values for a reference display (e.g., the minimum, and maximum luminance of the reference display), a mid value, say, for the average of the input data, and (y1, y3) values (e.g., the minimum and maximum luminance of the target display). In an embodiment, assuming, without limitations, a maximum dynamic range of (0.0001, 10,000) nits, the (x2, y2) values of the mid-tones anchor point (210) may be computed, shown in pseudo code, as follows:

//Initialization $x1 = \max(0.0001, \min(x1, y1));$ $x3 = \min(10{,}000, \max(x3, y3));$ //Constrain the range of the mid-tones (x2, y2) anchor point so it is not too close to either the lower or upper anchor points (e.g., within the 15% and 85% ranges)

$x2\max = (x3/x1)\hat{\ }0.85 * x1;$ $x2\min = (x3/x1)\hat{\ }0.15 * x1;$ $y2\max = (y3/y1)\hat{\ }0.85 * y1;$ $y2\min = (y3/y1)\hat{\ }0.15 * y1;$ //Solve for x2

$(\min x, \min y) = (0.0001, x2\min);$ $(\mathrm{mid}x, \mathrm{mid}y) = (sqrt(x2\min * x2\max), sqrt(x2\min * x2\max));$ $(\max x, \max y) = (10{,}000, x2\max)$ Solve for c1, c2, and c3 using the three x2 anchor points;

$x2 = (c1 + c2 * \mathrm{mid})/(1 + c3 * \mathrm{mid});$

//Solve for y2

$(\min x, \min y) = (0.0001, y2\min);$ $(\mathrm{mid}x, \mathrm{mid}y) = (sqrt(y2\min * y2\max), sqrt(y2\min * y2\max));$ $(\max x, \max y) = (10{,}000, y2\max)$ Solve for c1, c2, and c3 using the three y2 anchor points;

$y2 = (c1 + c2 * x2)/(1 + c3 * x2);$

//Apply the final transformation mapping $(\min x, \min y) = (x1, y1);$ $(\mathrm{mid}x, \mathrm{mid}y) = (x2, y2);$ $(\max x, \max y) = (x3, x3);$ Solve for c1, c2, and c3 using the three final transformation anchor points;

//For input values x compute corresponding output values y $y = (c1 + c2 * x)/(1 + c3 * x);$ Example Computer System Implementation Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations for images with high dynamic range, such as those described herein. The computer and/or IC may compute any of a variety of parameters or values that relate to image transformation processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to image transformations for HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient image transformation of HDR video to SDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to map using a processor an image from a first dynamic range to a second dynamic range, the method comprising:
   accessing first information data comprising a black point level (x1), a mid-tones level (x2), and a white point level (x3) in the first dynamic range;
   accessing second information data comprising a black point level (y1) and a white point level (y3) in the second dynamic range;
   determining a first and a second bounding value for a mid-tones level in the second dynamic range (y2) based on the second information data and a desired range of constant brightness, wherein the desired range of constant brightness is given by a percentage threshold above minimum brightness and a percentage threshold below maximum brightness;
   determining the mid-tones level in the second dynamic range (y2) based on the first and second information data, the first and second bounding values, and a mapping function using a piecewise linear mapping or a continuous function mapping for a mapping from the mid-tones level in the first dynamic range (x2) to the mid-tones level in the second dynamic range (y2), wherein the mapping function comprises a linear central segment with a slope of 1 in the log domain between the first and the second bounding value, wherein the first and the second bounding value represent values of the range between the black point level and the white point level in the second dynamic range;
   determining a parametrized sigmoid transfer function to map pixel values of the input image in the first dynamic range to corresponding pixel values of an output image in the second dynamic range, wherein the transfer function comprises three anchor points, wherein the first anchor point is determined using the black point levels in the first and second dynamic ranges (x1, y1), the second anchor point is determined using the white point levels in the first and second dynamic ranges (x3, y3), and the third anchor point is determined using the mid-tones levels of the first and second dynamic ranges (x2, y2); and
   mapping the input image to the output image using the determined transfer function.

2. The method of claim 1, wherein the first dynamic range comprises a high dynamic range and the second dynamic range comprises a standard dynamic range.

3. The method of claim 1, wherein the black point level in the first dynamic range is generated based on a black point level of a reference display and/or a black point level of the input signal, the white point level in the first dynamic range is generated based on a white point level of a reference display and/or a white point level of the input signal, and the mid-tones level in the first dynamic range is generated based on a mid-tones level of the input signal.

4. The method of claim 1, wherein the black point level in the second dynamic range is generated based on a black point level of a target display and the white point level in the second dynamic range is generated based on a white point level of the target display.

5. The method of claim 1, wherein the first bounding value represents a value between 15% and 30% of the range between the black point level and the white point level in the second dynamic range.

6. The method of claim 1, wherein the second bounding value represents a value between 70% and 85% of the range between the black point level and the white point level in the second dynamic range.

7. The method of claim 1, wherein determining the mid-tones level in the second dynamic range (y2) comprises computing the mapping function according to:

if $(x_2 < b_1)$, then $y_2 = f(x_2)$, if $(b_1 \leq x_2 \leq b_2)$, then $y_2 = x_2$, if $(b_2 < x_2)$, then $y_2 = g(x_2)$ wherein $b_1$ and $b_2$ denote the first and second bounding values, $x_2$ denotes the mid-tones level in the first dynamic range, and $f(\ )$ and $g(\ )$ denote mapping functions of the lower and upper section of the range of y values.

8. The method of claim 7, wherein the $f(\ )$ and $g(\ )$ mapping functions comprise spline functions.

9. The method of claim 7, wherein the $f(\ )$ and $g(\ )$ mapping functions comprise linear in log space functions.

10. The method of claim 9, wherein $$f(x_2) = \exp\left[\ln(y_1) + \ln\left(\frac{b_1}{y_1}\right) * \frac{\ln\left(\frac{x_2}{x_1}\right)}{\ln\left(\frac{b_1}{x_1}\right)}\right],$$

$$g(x_2) = \exp\left[\ln(b_2) + \ln\left(\frac{y_3}{b_2}\right) * \frac{\ln\left(\frac{x_2}{b_2}\right)}{\ln\left(\frac{x_3}{b_2}\right)}\right].$$

11. The method of claim 1, wherein the transfer function comprises a transformation according to:

$$y = \frac{C_1 + C_2 x}{1 + C_3 x}$$

wherein x denotes an input pixel value, y denotes an output pixel value, and $C_1$, $C_2$, and $C_3$ are parameters determined using the three anchor points.

12. The method of claim 1, wherein the mapping function for computing the mid-tones level $y_2$ in the second dynamic range comprises $$y_2 = \frac{C_1 + C_2 D}{1 + C_3 D},$$

wherein $C_1$, $C_2$, and $C_3$ are parameters determined using a second set of anchor points comprising $(x_1, b_1)$, ($\sqrt{b_1 b_2}$, $\sqrt{b_1 b_2}$), ($x_3$, $b_2$), wherein $b_1$ and $b_2$ denote the first and second bounding values, $x_1$ and $x_3$ denote the black point level and the white point level in the first dynamic range, and D denotes a second mid-tones level in the first dynamic range computed based on the mid-tones level in the first dynamic range.

13. The method of claim 12, wherein computing the second mid-tones level D in the first dynamic range comprises computing $$D = \frac{C_1 + C_2 x_2}{1 + C_3 x_2},$$

wherein $C_1$, $C_2$, and $C_3$ are parameters determined using a third set of anchor points comprising ($x_1$, $d_1$), ($\sqrt{d_1 d_2}$, $\sqrt{d_1 d_2}$), ($x_3$, $d_2$), wherein $d_1$ and $d_2$ denote a second set of first and second bounding values based on the range between the black point level and the white point level in the first dynamic range, $x_1$ and $x_3$ denote the black point level and the white point level in the first dynamic range, and $x_2$ denotes the mid-tones level of the input image.

14. An apparatus comprising a processor and configured to perform the method recited in claim 1.

15. A non-transitory computer-readable storage medium having stored thereon computer-executable instruction for executing a method with one or more processors in accordance with claim 1.

* * * * *